UNITED STATES PATENT OFFICE.

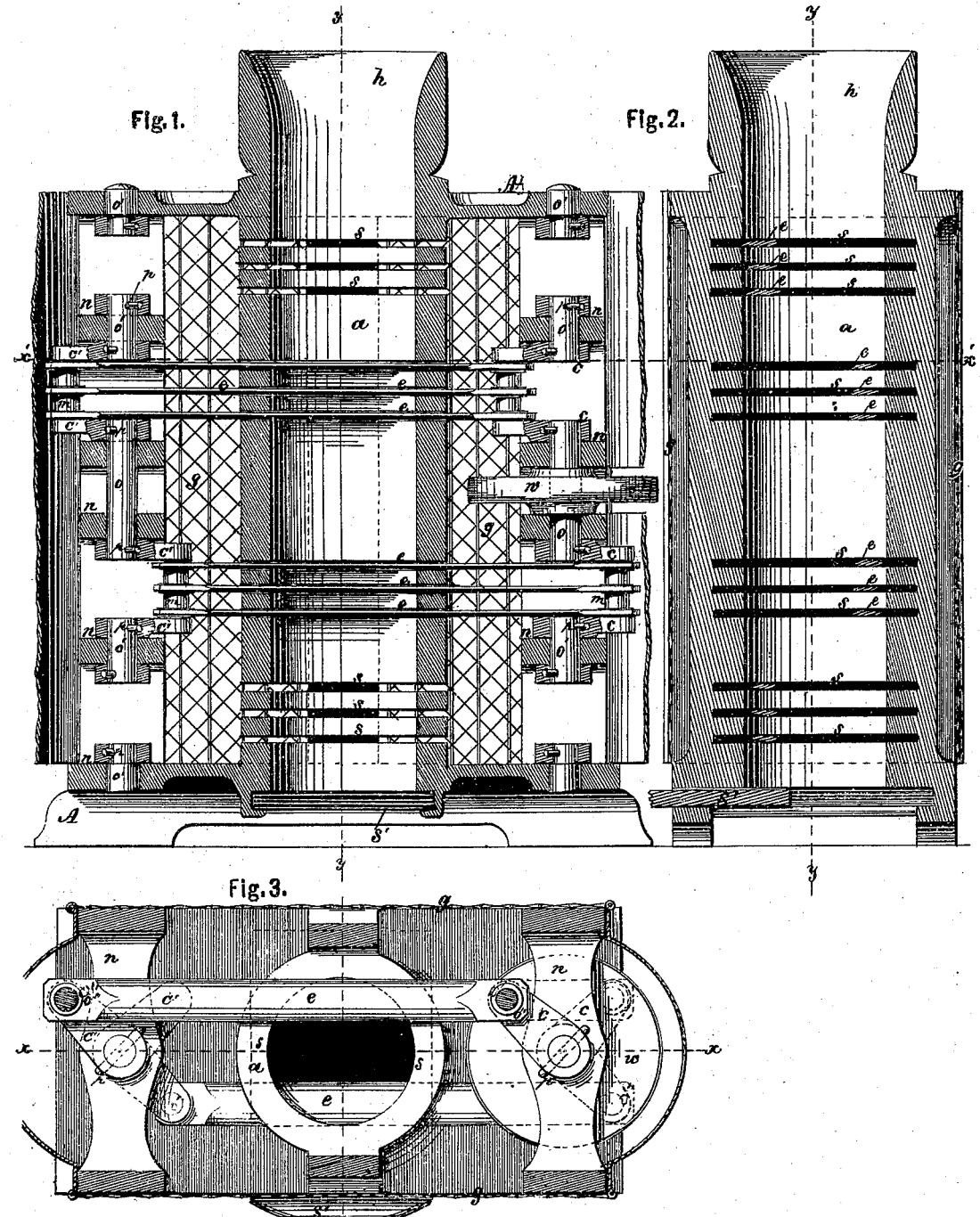

JACOB STEPP, OF SOMERVILLE, MASSACHUSETTS.

IMPROVEMENT IN MEAT AND VEGETABLE CUTTERS.

Specification forming part of Letters Patent No. 130,544, dated August 13, 1872.

Specification of certain Improvements in Meat and Vegetable Cutters, invented by JACOB STEPP, of Somerville, in the county of Middlesex and State of Massachusetts.

This invention consists in the employment of a hollow cylinder provided with a series of transverse slots, in which double-edged knives are made to receive a reciprocating motion by means of double cranks or eccentrics journaled at each end of the frame which supports the cylinder, and connected together by knives, which serve as pitmen or connecting-rods between the crank-shafts, which are driven by power applied to one of them. The meat is fed through a hopper at the upper end of the hollow cylinder, and a slide is arranged in its lower end to regulate the passage of the cut material.

In the accompanying drawing, Figure 1 is a vertical longitudinal section of a machine embodying my improvements through the line $x$ $x$, Fig. 2. Fig. 2 is a transverse section of the same through the line $yy$, Figs. 1 and 3. Fig. 3 is a horizontal section of the same through the line $x'$ $x'$, Fig. 1.

A A is the frame of the machine, which supports the hollow cylinder or pipe $a$, provided with a series of slots, $s\ s\ s$, for the passage of the knives $e\ e$, and having a hopper, $h$, at its upper end, through which the meat is fed, and a slide, $s'$, at bottom to regulate its passage out of the cylinder. $n\ n$ are horizontal pieces attached to the ends of the frame A, in which and the top and bottom pieces of the frame A are journaled the double-crank shafts $o\ o\ o\ o'$ $o'\ o'$. The double-edged knives $e\ e$ are provided with bushed perforations $o''\ o''$ in each of their ends, in which the pins $m\ m\ m'\ m'$ of the double cranks $c\ c\ c'\ c'$ are inserted, the knives thus serving as connecting-rods or pitmen between the opposite sets of double cranks. Power being applied to the wheel $w$, a reciprocating motion will be imparted by the double cranks to the double-edged knives $e\ e$. $p$ $p$ are pins passing through the inner ends of the crank-arms and through the shafts $o\ o\ o'\ o'$ for retaining them in place. By removing these pins the crank-arms and knives can readily be removed for sharpening the latter or for other purposes. To prevent the egress of the cut material through the slots $s\ s$ a screen, $g\ g$, is employed.

The knives $e\ e$ are double-edged to cut in both directions in their reciprocating movement, and from my construction it is obvious that the knives, not coming in contact with any material but the meat or vegetables to be cut, will remain sharp a longer time than those coming in contact with wood, and when dull they can readily be removed, as described, for sharpening.

I prefer to arrange the cylinder $a$ vertically with the hopper $h$ on its upper end, as shown.

I claim as my invention—

1. The double-edged knives $e\ e$, serving both as pitmen and cutters, in combination with the double cranks $c\ c\ m\ c'\ c'\ m'$, as set forth.

2. The double cranks $c\ c\ m\ c'\ c'\ m'$, shafts $o$ $o'$, and pins $p\ p$, in combination with the double-edged knives $e\ e$, as and for the purpose set forth.

3. The slotted cylinder $a$, in combination with the double-edged knives $e\ e$ and double cranks $c\ c\ m\ c'\ c'\ m'$, journaled in opposite ends of the frame, substantially as set forth.

JACOB STEPP.

Witnesses:
 CHARLES PROSSER;
 JACOB STEPP, Sr.